Oct. 25, 1966   L. J. CZERWONKA   3,280,985
FLUID FILTER ARRANGEMENT
Filed Aug. 26, 1963
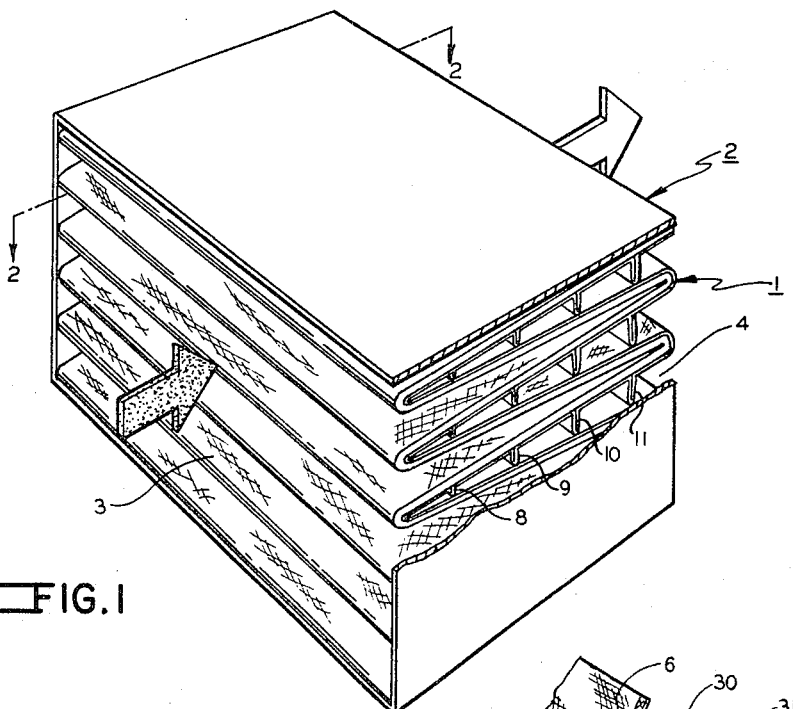
FIG. 1
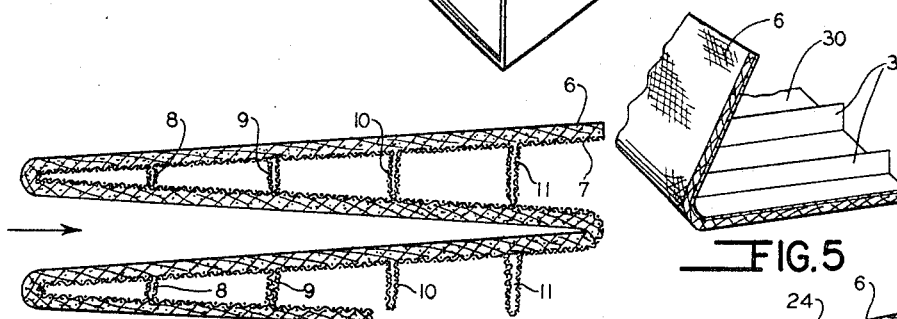
FIG. 2
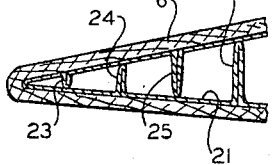
FIG. 5
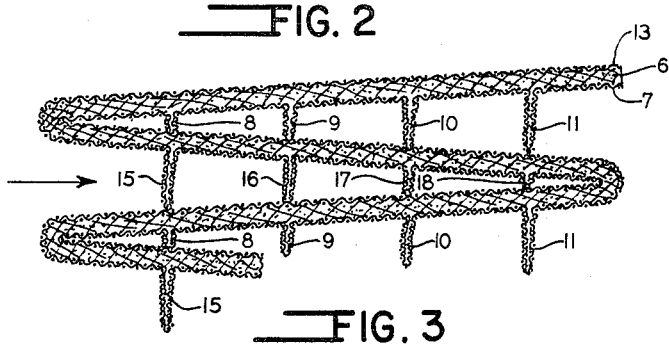
FIG. 3
FIG. 4
INVENTOR.
LAWRENCE J. CZERWONKA
BY
Ralph B. Brick
ATTORNEY

United States Patent Office 3,280,985
Patented Oct. 25, 1966

3,280,985
FLUID FILTER ARRANGEMENT
Lawrence J. Czerwonka, Louisville, Ky., assignor to American Air Filter Company, Inc., Louisville, Ky., a corporation of Delaware
Filed Aug. 26, 1963, Ser. No. 304,580
9 Claims. (Cl. 210—489)

The present invention relates to fluid filters and more particularly to pleat-form fluid filters of the unit type incorporating self-sustaining, deformable filter medium.

In accordance with the present invention, a novel unit filter arrangement is set forth which includes an economical and straightforward filter media cartridge of pleat form having an arrangement which can be readily fabricated for film and stable support of the several pleats of the cartridge without requiring complex and cumbersome support devices and without presenting undue resistance to a fluid stream to be treated. In addition, the present invention provides a pleat-form cartridge for fluid filters which can be readily adapted to any one of a number of geometric configurations and which can be utilized effectively with large filter areas under various fluid filtering conditions.

Other features of the present invention will become obvious to one skilled in the art upon reading of the disclosure set forth herein.

More particularly, the present invention provides a filter cartridge for a unit type fluid filter comprising: a web of scrim type, self-sustaining, deformable, gas pervious filter medium, the web being folded upon itself to include structural rib means integral with and extending longitudinally across the web face substantially normal to and arising out of a plane determining the web face; the web being arranged in pleat-form with the rib means thereof extending between opposite walls of a pleat to form a structural support for such pleat.

It is to be understood that various changes can be made in the arrangement, form and construction of the apparatus disclosed herein without departing from the scope or spirit of the present invention.

Referring to the drawing:

FIGURE 1 is a partially broken away perspective view of a unit type fluid filter structure incorporating a novel filter cartridge arrangement;

FIGURE 2 is an enlarged, cross-sectional view of a portion of the filter cartridge of FIGURE 1, taken in a plane passing through line 2—2 of FIGURE 1;

FIGURE 3 is a cross-sectional view similar to that of FIGURE 2, disclosing a portion of a modified filter cartridge arrangement;

FIGURE 4 is a cross-sectional view also similar to that of FIGURE 2, disclosing a further modified filter cartridge arrangement; and FIGURE 5 is a perspective view of a portion of a filter cartridge arrangement in partially folded position, disclosing still a further modification of the present invention.

As can be seen in FIGURE 1 of the drawing, an inventive filter cartridge 1 is disclosed as mounted for support in open-ended rectangular filter frame housing 2. Housing 2 is provided with upstream dirty gas inlet 3 and downstream clean gas outlet 4. Housing 2 can be made from any one of a number of suitably rigid structural materials, such as cardboard, wood or thin gauge metal, the material selected depending upon the environment in which the filter is to be used.

Filter cartridge 1, as disclosed in FIGURE 2 of the drawing, advantageously includes a finer and comparatively more efficient filter medium upstream web 6 and a more porous after-filter type downstream web 7 of filter medium, the webs 6 and 7 being positioned in coextending, faced relationship with respect to each other and arranged as a unit in pleat-form within open ended housing 2 to extend across a dirty gas stream to be treated. It is to be noted that the edges of the faced webs can be glued in sealed relationship to the internal side walls of filter housing 2 by any one of a number of suitable glues. Advantageously, a rubber base cement of a type well known in the art can be used.

As disclosed in FIGURE 1, upstream web 6 of filter medium can be of substantially three dimensional, expanded filamentous, glass fiber material of a type like that disclosed in U.S. Modigliani Patent No. 2,546,230, granted March 27, 1951, with the fibers interconnected and bonded to form a maze of interstices therebetween. It is to be understood that the material used for web 6 is not to be considered as limited to expanded, filamentous glass fibers but that any one of a number of other suitable filter materials can be used, depending upon the nature of the fluid stream to be treated. For example, web 6 can be made from synthetic fibrous materials such as nylon or Orlon or, if desired, a natural fibrous material such as hogs hair also can be used.

Web 7 can be made of wire hardware cloth, a scrim type open mesh wool or a textile fiber, such as No. 6 mesh "Dixinet," manufactured by Swift Manufacturing Co., Chicago, Illinois. When the web is made of a soft fabric such as Dixinet, the web is stiffened to a degree approaching the rigidity of wire hardware cloth so as to provide a self-sustaining, deformable foraminated backing member for web 6. To accomplish the stiffening of web 7, the scrim web can first be dipped into a water-glass or sodium silicate solution ($NA_2SiO_3$). Excess solution is removed by a wringing process and the web dried—either in an oven or by exposing the same to air over a selected period of time. The water-glass, in addition to stiffening the scrim, serves to act as a fire retardant. It is to be understood that the preesnt invention is not to be considered as limited to a stiffening agent such as waterglass. For example, a polyvinyl chloride solution in the form of a glue has been found satisfactory as a stiffening agent.

As can be seen in FIGURE 2 of the drawing, stiffened web 7 is folded upon itself to include sets of spaced, parallel ribs 8, 9, 10, and 11 which extend longitudinally across the overall width of the web in spaced relationship substantially normal to and arising out of a plane determining the web face. The ribs of each set are of a preselected depth to extend fully between opposite walls of a pleat to determine the pleat configuration and to form structural supports for such pleat, the spaced ribs of each set as disclosed in FIGURE 2 increasing successively in depth along the line of fluid flow in order to provide the V-shaped type pleat disclosed. It is to be noted that web 7 can be so folded taht each rib is of triangular cross-sectional configuration in order to give maximum structural support for large filter material areas with a minimum of resistance. It is to be understood that facing webs 6 and 7 can be joined to each other by a suitable elastic adhesive material such as natural rubber, synthetic rubber, or an adhesive resinuous or other plastic material applied in solution or emulsion form. For example, an aqueous suspension of latex of the synthetic type can be used to accomplish this. It also is to be understood that webs 6 and 7 need not be adhesively joined to each other but that one web can be furnished as a back up means for the other, either in a continuous integral form or in several wedge-shaped individual units if desired. It further is to be understood that a filter media comprised of a sole web sheet can be utilized, such web sheet being comparable to the self-sustaining, deformable web 7 aforedescribed but of much finer mesh.

As can be seen in FIGURE 3 of the drawing, to insure further filter cartridge stability upstream pleat supports can be provided along the upstream side of web 6 by utilizing web 13 having sets of spaced, parallel ribs 15, 16, 17 and 18 formed and spaced in a manner similar to the ribs 8, 9, 10, and 11 of web 7.

As can be seen in FIGURE 4 of the drawing, a stiffened scrim web 21 can be provided in faced relation with web 6, the spaced, parallel ribs of the rib sets being arranged in such a manner that successive ribs 23, 24, 25 and 26 extend alternately from opposite walls of a pleat to provide an "interleaved" rib effect, the depths of adjacent ribs being adjusted to give the desired pleat configuration.

Finally, as can be seen in FIGURE 5 of the drawing, a stiffened scrim web 30 can be provided with spaced parallel ribs 31 of each set arranged to extend normal to the crests of the pleat formed by the web. As disclosed, the depth of each rib is constant along the line of fluid flow. However, it is to be understood that, if desired, the web itself can be contoured and folded in such a manner as to provide ribs of increasing depth along the line of fluid flow.

The invention claimed is:

1. A filter cartridge for a unit type fluid filter comprising:
   (a) a web of self sustaining, deformable, gas pervious filter medium presenting an upstream and downstream face to the gas stream to be treated;
   (b) said web being folded upon itself in faced substantially adjacent relation to provide thin structural rib means integral with and extending transversely across the downstream face of said web in a plane substantially normal to said downstream web face;
   (c) said web being arranged in pleat form with said rib means thereof extending between opposite walls of a pleat to form a structural support for said pleat on the downstream side thereof.

2. The apparatus of claim 1:
   (a) said thin rib means including at least one thin rib extending adjacent the crest of said pleat on the downstream face of said web.

3. The apparatus of claim 2:
   (a) said thin rib means extending normal to the crest of said pleat.

4. The apparatus of claim 2:
   (a) said thin rib means extending parallel to the crest of said pleat.

5. A filter cartridge for a unit type fluid filter comprising:
   (a) a web of self-sustaining, deformable gas pervious filter medium presenting an upstream and downstream face to the gas stream to be treated;
   (b) said web being folded upon itself in faced substantially adjacent relation to provide a set of spaced parallel thin ribs integral with and extending transversely across the downstream face of said web face substantially normal to said web;
   (c) said web being arranged in pleat-form;
   (d) said ribs of said set each having a preselected depth along the line of fluid flow so that each rib of said set extends fully between opposite walls of a pleat to determine the pleat configuration and to form structural supports for said pleat.

6. The apparatus of claim 5:
   (a) said ribs being so arranged that successive ribs in a pleat extend alternately from opposite walls of said pleat.

7. A filter cartride for a unit type fluid filter comprising:
   (a) a first web of fibrous filter medium;
   (b) a second web of self-sustaining deformable filter medium positioned in coextending faced relation to said first web of medium on the downstream side thereof;
   (c) said second web being folded upon itself in faced substantially adjacent relationship to provide a thin rib means integral with and extending transversely across said web face in a plane substantially normal to the face of said web;
   (d) said coextending faced webs being arranged in pleat-form with said thin rib means of said second web extending between opposite walls of a pleat to form a structural support for said pleat.

8. A filter cartridge for a unit type fluid filter comprising:
   (a) an upstream web of substantially three dimensional fibrous filter medium;
   (b) a downstream web of substantially two dimensional self-sustaining, deformable filter medium positioned in coextending faced relationship to said first web of medium;
   (c) said downstream web being folded upon itself in faced substantially adjacent relation to provide sets of spaced parallel thin ribs integral with and extending transversely across said web face substantially normal to the face of said web;
   (d) said webs being arranged in pleat-form to include a plurality of adjacent side-by-side pleats adaptable to extend across a fluid stream to be treated;
   (e) said ribs of each set being so positioned that each rib of a set extends between opposite downstream walls of a pleat parallel to the crest thereof to form structural support for said pleats.

9. The apparatus of claim 8: and
   (a) an upstream web of substantially two dimensional self-sustaining, deformable filter medium positioned in coextending, faced relationship with said three dimensional fibrous medium;
   (b) said upstream web of two dimensional filter medium including sets of spaced parallel ribs integral with and extending transversely across the face of said web substantially normal to the face of said web;
   (c) said ribs of each set being so positioned that each rib of a set extends between opposite upstream walls of a pleat parallel to the crest thereof to form additional structural support for said pleats.

References Cited by the Examiner

UNITED STATES PATENTS

| | | | |
|---|---|---|---|
| 1,830,096 | 11/1931 | Dollinger | 55—500 |
| 1,893,048 | 1/1933 | Birkholz | 55—500 |
| 2,022,740 | 12/1935 | Rowell | 55—521 |
| 2,058,669 | 10/1936 | Dollinger | 55—521 |

FOREIGN PATENTS 1,296,701  3/1962  France.

REUBEN FRIEDMAN, *Primary Examiner.*
SAMIH N. ZAHARNA, *Examiner.*
C. DITLOW, *Assistant Examiner.*